United States Patent
Le Saint

(10) Patent No.: US 9,331,990 B2
(45) Date of Patent: May 3, 2016

(54) TRUSTED AND UNSUPERVISED DIGITAL CERTIFICATE GENERATION USING A SECURITY TOKEN

(75) Inventor: Eric F. Le Saint, Los Altos, CA (US)

(73) Assignee: Assa Abloy AB, Stockholm (SE)

( * ) Notice: Subject to any disclaimer, the term of this patent is extended or adjusted under 35 U.S.C. 154(b) by 695 days.

(21) Appl. No.: 10/740,889

(22) Filed: Dec. 22, 2003

(65) Prior Publication Data

US 2005/0138386 A1      Jun. 23, 2005

(51) Int. Cl.
```
H04L 29/06    (2006.01)
H04L 9/32     (2006.01)
G06Q 20/38    (2012.01)
H04L 9/00     (2006.01)
```

(52) U.S. Cl.
CPC ........ H04L 63/062 (2013.01); G06Q 20/38215 (2013.01); H04L 9/006 (2013.01); H04L 9/321 (2013.01); H04L 9/3234 (2013.01); H04L 9/3263 (2013.01); H04L 9/3268 (2013.01); H04L 9/3271 (2013.01); H04L 63/0853 (2013.01); H04L 63/12 (2013.01); G06F 2221/2103 (2013.01); G06F 2221/2115 (2013.01); G06F 2221/2153 (2013.01); H04L 2209/56 (2013.01); H04L 2209/80 (2013.01)

(58) Field of Classification Search
CPC ...... H04L 9/3263; H04L 9/3268; H04L 9/321
USPC ............... 235/380; 705/65; 713/185, 175
See application file for complete search history.

(56) References Cited

U.S. PATENT DOCUMENTS 5,559,889 A * 9/1996 Easter .................... G06F 21/72
                                                        380/30
5,721,781 A   2/1998 Deo et al.

(Continued)

FOREIGN PATENT DOCUMENTS

EP     1191743     3/2002
EP     1263164     12/2002

(Continued)

OTHER PUBLICATIONS

Sundeep Bajikar; Trusted Platform Module (TPM) based Security on Notebook PCs—White Paper; Mobile Platforms Group; Intel Corporation; Jun. 20, 2002.*

(Continued)

*Primary Examiner* — James Turchen
(74) *Attorney, Agent, or Firm* — Muirhead and Saturnelli, LLC

(57) ABSTRACT

A method, system and computer program product for ensuring PKI key pairs are operatively installed within a secure domain of a security token prior to generating a digital certificate. The public key component of the PKI key pair is incorporated into a digital certificate which is returned to the security token for storage. The arrangement included herein incorporates the use of a critical security parameter to ensure a chain of trust with an issuing entity such as a registration authority. Furthermore, the arrangement does not require security officer or system administrator oversight during digital certificate generation as the critical security parameter provides a sufficient level of trust to ensure that digital certificate generation is being performed in conjunction with a designated security token rather than a rogue application. Lastly, separate inventive embodiments allow alternate communications and verification arrangements to be implemented.

42 Claims, 12 Drawing Sheets

(56) References Cited

U.S. PATENT DOCUMENTS

| | | | | |
|---|---|---|---|---|
| 5,768,389 | A * | 6/1998 | Ishii | H04L 9/0897 380/277 |
| 5,781,723 | A * | 7/1998 | Yee | G06F 9/4411 713/159 |
| 5,787,101 | A * | 7/1998 | Kelly | G06F 13/4226 235/380 |
| 5,970,147 | A * | 10/1999 | Davis | H04L 9/0825 380/282 |
| 5,982,898 | A * | 11/1999 | Hsu | H04L 9/321 713/156 |
| 6,035,402 | A * | 3/2000 | Vaeth | H04L 9/321 713/158 |
| 6,038,551 | A * | 3/2000 | Barlow | G06Q 20/105 235/380 |
| 6,157,719 | A * | 12/2000 | Wasilewski | H04L 63/04 348/E5.004 |
| 6,202,151 | B1 * | 3/2001 | Musgrave | G06Q 20/04 713/170 |
| 6,212,634 | B1 * | 4/2001 | Geer, Jr. | G06Q 20/3821 380/280 |
| 6,332,193 | B1 * | 12/2001 | Glass | G06F 21/32 713/170 |
| 6,367,011 | B1 * | 4/2002 | Lee | G06F 21/77 380/255 |
| 6,430,688 | B1 * | 8/2002 | Kohl | H04L 63/0442 380/277 |
| 6,484,259 | B1 * | 11/2002 | Barlow | G06F 21/602 380/30 |
| 6,490,367 | B1 * | 12/2002 | Carlsson | G06Q 20/341 382/115 |
| 6,513,117 | B2 * | 1/2003 | Tarpenning | G06F 21/10 380/252 |
| 6,738,912 | B2 * | 5/2004 | Buttiker | G06Q 20/3821 380/241 |
| 6,763,459 | B1 * | 7/2004 | Corella | H04L 9/006 713/156 |
| 6,854,056 | B1 * | 2/2005 | Benantar | H04L 9/3263 380/282 |
| 6,948,061 | B1 * | 9/2005 | Dierks | H04L 9/006 713/156 |
| 6,973,191 | B2 | 12/2005 | Audebert et al. | |
| 7,020,778 | B1 * | 3/2006 | Miettinen | H04L 9/3247 379/93.02 |
| 7,024,226 | B2 * | 4/2006 | Sandberg | H04L 9/006 455/558 |
| 7,165,181 | B2 * | 1/2007 | Brickell | H04L 9/3271 713/168 |
| 7,206,936 | B2 * | 4/2007 | Aull | G06Q 20/341 713/173 |
| 2002/0026578 | A1 | 2/2002 | Hamann et al. | |
| 2002/0108042 | A1 * | 8/2002 | Oka | H04L 9/14 713/175 |
| 2002/0188848 | A1 * | 12/2002 | Buttiker | G06Q 20/3821 713/175 |
| 2003/0005317 | A1 | 1/2003 | Audebert et al. | |
| 2003/0115468 | A1 * | 6/2003 | Aull | H04L 9/0825 713/175 |
| 2004/0053642 | A1 * | 3/2004 | Sandberg | H04L 9/006 455/558 |
| 2004/0218762 | A1 | 11/2004 | Le Saint et al. | |
| 2005/0066191 | A1 * | 3/2005 | Thibadeau | G06F 21/805 726/26 |

FOREIGN PATENT DOCUMENTS

| | | |
|---|---|---|
| EP | 1322086 | 6/2003 |
| WO | 9919846 | 4/1999 |
| WO | WO 00/79724 A2 | 12/2000 |

OTHER PUBLICATIONS

Applied Cryptography: Protocols, Algorithms, and Source Code in C, Second Edition~Bruce Schneier~Wiley; 2nd edition (Oct. 18, 1996)~pp. 34-41.*

"Interoperability Specification for ICCs and Personal Computer Systems," Part 1 Introduction and Architecture Overview, PC/SC workgroup, Revision 1.0, Dec. 1997, pp. 1-18.

"Interoperability Specification for ICCs and Personal Computer Systems," Part 2, Interface Requirements for Compatible IC Cards and Readers, PC/SU workgroup, Revision 1.0, Dec. 1997, pp. 1-18.

"Interoperability Specification for ICCs and Personal Computer Systems," Part 3 Interface Requirements for PC-Connected Interface Devices, PC/SC workgroup, Revision 1.0, Dec. 1997, pp. 1-19.

"Interoperability Specification for ICCs and Personal Computer Systems," Part 4 IFD Design Considerations and Reference Design Information, PC/SC workgroup, Revision 1.0, Dec. 1997, pp. 1-18.

"Interoperability Specification for ICCs and Personal Computer Systems," Part 5, ICC Resource Manager Definition, PC/SC workgroup, Revision 1.0, Dec. 1997, pp. 1-21.

"Interoperability Specification for ICCs and Personal Computer Systems," Part 6, ICC Service Provider Interface Definition, PC/SC workgroup, Revision 1.0, Dec. 1997, pp. 1-36.

"Intolerability Specification for ICCs and Personal Computer Systems," Part 7, Application Domain and Developer Design Considerations, PC/SC workgroup, Revision 1.0, Dec. 1997, pp. 1-14.

"Interoperability Specification for ICCs and Personal Computer Systems," Part 8. Recommendations for ICC Security and Privacy Devices, PC/SC Workgroup, Revision 1.0, Dec. 1997, pp. 1-37.

"PC/SC Workgroup Specification Overview," Dec. 10, 2003, pp. 1-2.

European Search Report dated Apr. 8, 2005.

* cited by examiner

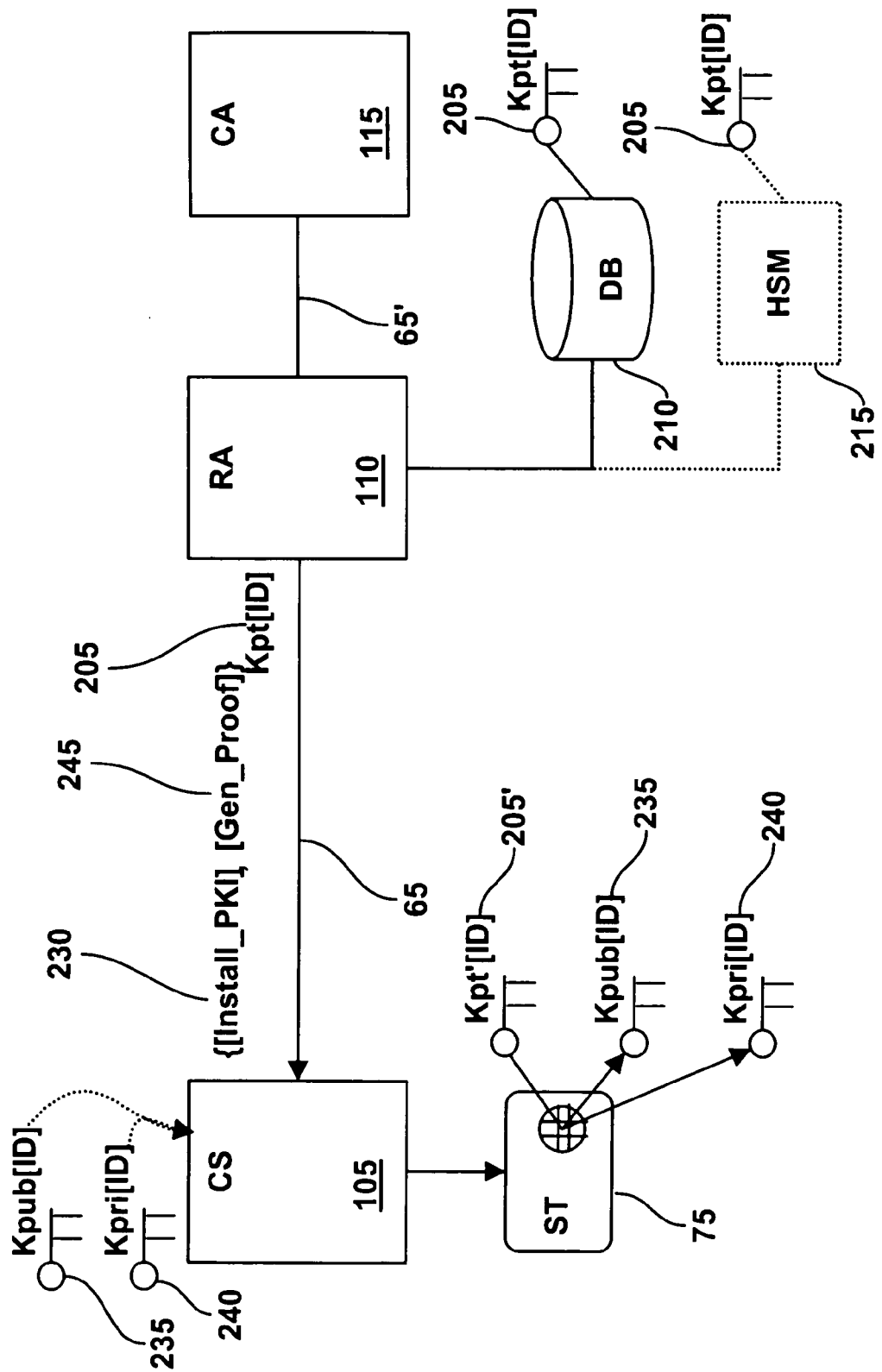
FIG. 2B1

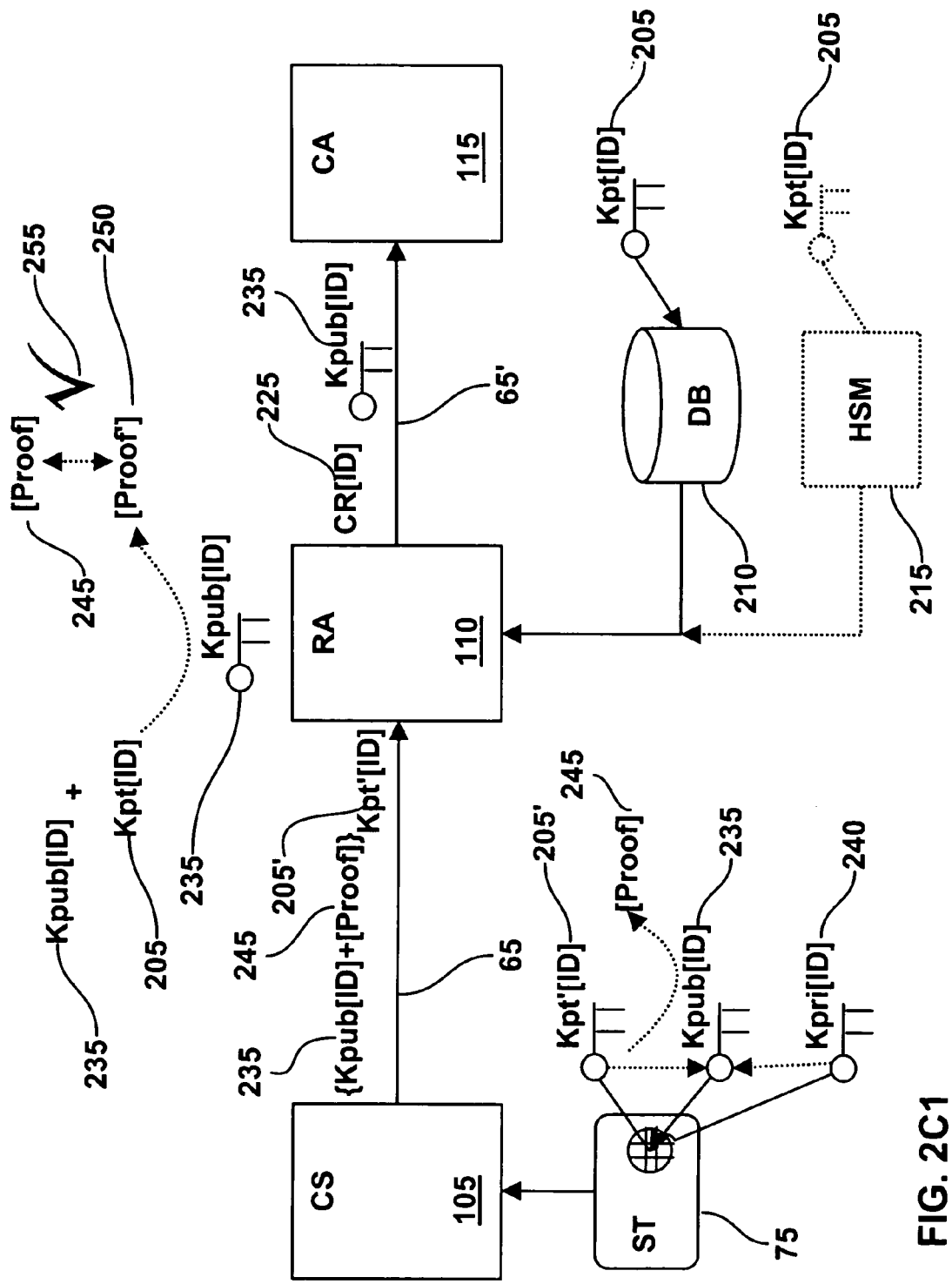
FIG. 2C1

TRUSTED AND UNSUPERVISED DIGITAL CERTIFICATE GENERATION USING A SECURITY TOKEN

FIELD OF INVENTION

The present invention relates generally to a data processing method, system and computer program product and more specifically to a method, system and computer program product for generating a trusted digital certification using a security token without requiring security officer supervision.

BACKGROUND

In the relevant art, digital certificate generation in enterprise and government operating environments may require an entity to be supervised by a security officer to firstly verify the identity of the entity and secondly to provide a trusted computer system for generation and registration of public key infrastructure (PKI) keys within the secure domain of the security token. The trusted computer system is provided to ensure that any PKI keys are actually generated by the security token rather than by another source. This process physically requires the user to present credentials such as a driver's license or passport to the security officer who then oversees the PKI key generation process. This supervised mechanism, while relatively secure, is expensive to maintain and is inconvenient to an individual who may simply want to replace an expired digital certificate or has already been verified.

Alternative certificate generation mechanisms are known in the relevant art but generally do not provide the critical assurance that the key pair is actually installed inside the security token rather than a rogue application impersonating the security token. For example, a virtual token emulator virus could cause a PKI key pair to be generated externally on a host computer system in which the public key from the illicit PKI key pair generation becomes incorporated into a digital certificate, registered and stored inside the security token.

In most cases, security token are designed to prevent unauthorized injection of private keys. However, the user, having unintentionally stored a bogus digital certificate, will lack the ability to utilize security token services and will likely have to go through the process of invalidating the bogus digital certificate which may have already become widely distributed. Furthermore, if the virtual token emulator virus were to become widespread, the resulting damage and loss of productivity could potentially be as disruptive to an enterprise or other organization as if legitimate private keys were compromised.

A number of mechanisms are available in the relevant art which attempt to address illicit certificate generation. For example, in a traditional mechanism, U.S. Pat. No. 5,721,781 to Deo, et al., provides an authentication system in which a security token is assigned its own digital certificate. The digital certificate contains a digital signature from a trusted certifying authority and a unique public key. In another example, U.S. patent application US 2002 0026578 to Hamann, et al., provides a mechanism for secure usage of digital certificates and related PKI keys on a security token. The arrangement provided by Hamann et al., allows secure importation of digital certificates into the security token. However, neither the latter nor the former mechanisms provide proof that the PKI keys are installed inside the security token.

In another mechanism, WIPO application WO0079724A2, to Immonen, provides a manufacturer's digital certificate. The digital certificate is stored inside the security token which permits a Certification Authority to verify the creation and storage of a PKI key pair within the secure domain of the security token. Lastly, U.S. patent application US2003/0005317 (Ser. No. 09/892,904) to Audebert, et al., provides an alternate mechanism for generating and verifying a key protection certificate. U.S. patent application US 2003 0005317 is to a common assignee which is herein incorporated by reference and not admitted as prior art. Both of these mechanisms provide added assurances that the PKI key pair is actually installed inside the secure domain of a secure token.

Therefore, a trusted security token PKI key pair generation and verification arrangement which prevents unauthorized digital certificate generation and does not require security officer oversight is a highly desirable security feature.

SUMMARY

This invention addresses the limitations described above and provides a trusted mechanism for generating a digital certificate using a security token without requiring a security officer or system administrator to verify the user or entity's identity or oversee the certificate generation process. The invention further provides assurances that the generated digital certificate actually incorporates a public key obtained from the secure domain of the security token.

It will be appreciated by one skilled in the art that the trusted digital certificate generation process is not limited to anthropologic implementations. The digital certificate may be associated with either animate or inanimate objects such as an end user, an animal having an embedded security token for identification purposes or an intelligent device requiring a digital certificate including but not limited to computer systems, cellular telephones, personal data assistants, key card readers and electronic locks. These various associations are referred to herein as entities.

The term "security token" as described herein includes hardware based security devices such as cryptographic modules, smart cards, integrated circuit chip cards, portable data carriers (PDC), personal security devices (security token), subscriber identification modules (SIM), wireless identification modules (WIM), USB token dongles, identification tokens, secure application modules (SAM), hardware security modules (HSM), secure multi-media token (SMMC), trusted platform computing alliance chips (TPCA) and like devices.

The term, "critical security parameter" (CSP) as defined herein includes authentication data, passwords, PINs, secrets, symmetric and private cryptographic keys which are to be entered into or output from a cryptographic module using a secure mechanism. The definition included herein is intended to be synonymous with the definition of CSP included in FIPS PUB 140-2, "Security Requirements for Cryptographic Modules." References included herein to a proof of token key or key set should be considered under the broader CSP definition rather than a specific symmetric or asymmetric key.

In one embodiment of the invention, a method is described for issuing a trustworthy digital certificate without a security officer intermediary. The certificate issuance methodology is initiated when an entity inserts or otherwise operatively couples a security token to a computer system and invokes a certificate issuance/renewal application installed or otherwise accessible using the computer system.

The certificate issuance/renewal application generates an entity specific digital certificate request which is sent to a registration authority. The entity specific digital certificate request includes at least an entity identifier such as unique entity name or a unique security token identifier which is masked into the security token's non-volatile memory during the token's manufacturing process.

Upon receiving the entity specific digital certificate request, the registration authority performs a security transaction with the security token and sends a PKI key pair generation command to the security token. The security transaction incorporates the use of a pre-established proof of token key set securely installed in the security token before issuance to the end-entity which is retrieved from a secure storage location based on information included in the entity specific digital certificate request.

Depending on the particular embodiment of the invention, the security transaction may occur before or after a PKI key pair generation command is sent from the registration authority to the security token.

The security token receives the PKI key pair generation command, generates a public key infrastructure (PKI) key pair and returns a public key component of the generated PKI key pair to the registration authority. In a first embodiment of the invention, a proof in form of a keyed hash message authentication code (HMAC) operation is generated from the generated public key using the proof of token key and sent along with the public key to the registration authority. In a second embodiment of the invention, the public key is signed using the generated private key. The digital signature and public key are then sent to the registration authority in encrypted form for authenticity confirmation.

In a first embodiment the proof of token key is used in generating the keyed HMAC of the public key which provides assurances to the registration authority that the PKI key pair was actually generated within the secure domain of the security token rather than elsewhere. In a second embodiment of the invention the proof of token keys is used for encryption and decryption of information exchanged between the registration authority and the security token. The registration authority retrieves the counterpart proof of token key from a database, datastore or a hardware security device using the unique entity and/or security token identifier as a cross reference.

In a first embodiment the registration authority generates another HMAC of the received public key using the counterpart proof of token key compares the generated HMAC to the HMAC received from the security token. A match indicates that the public key was actually generated by the security token while a mismatch indicates either the public key was not generated by the security token or an incorrect entity/security token identifier was provided. In the case of a failed security transaction, processing ends and the entity must repeat the transaction. In a second embodiment of the invention, a digital signature is received by the registration authority, decrypted using the public key received from the security token and authenticity confirmed.

In a third embodiment of the invention, the proof of token key set is used as key material for a secure messaging arrangement after successfully completing a challenge/response security transaction controlled by the registration authority. The secure messaging arrangement provides a secure end-to-end communications channel between the security token and the registration authority using a symmetric encryption mechanism.

In all embodiments of the invention, following successful confirmation of the proof, the registration authority sends the public key and one or more entity specific datum to a certificate authority. The certificate authority generates an entity specific digital certificate which is then sent either directly or indirectly to the computer system for storage inside the security token. The certificate authority may be a separate third party entity such as Verisign® or an internal entity such as an enterprise certificate generation server or an integrated registration and certificate generation server.

From a system perspective, the invention is comprised of a security token functionally coupled to a computer system and in processing communications with at least a registration authority via the computer system. The security token is adapted to at least operatively store a PKI key pair and perform at least one security transaction which incorporates at least a pre-established critical security parameter. The least one security transaction comprises a challenge/response protocol, a keyed hashed message authentication code, a digital signature or a combination thereof.

In this systematic embodiment of the invention, the computer system is adapted to at least receive input from an entity, initiate a digital certification generation process between the security token and the at least a registration authority and exchange communications between the security token and the least at least a registration authority. Lastly, in this systematic embodiment of the invention, the registration authority is adapted to at least cause the PKI key pair to be stored in the security token, cause the security token to perform the at least one security transaction and confirm that the pre-established critical security parameter is operatively stored within the security token.

In a further systematic embodiment of the invention, the security token is further adapted to send a public key associated with the PKI key pair to at least the registration authority and operatively store a digital certificate which incorporates said public key. In this further systematic embodiment of the invention, the registration authority is further adapted to cause the digital certificate to be generated and to cause the digital certificate to be operatively stored by the security token.

From a second systematic perspective, a second embodiment of the invention comprises a security token including; a token processor, a token memory coupled to the token processor, a pre-established critical security parameter operatively stored in at least a portion of the token memory, and one or more token applications operatively stored in a second portion of the token memory having instructions executable by the token processor to at least operatively store a PKI key pair in a third portion of the token memory, and perform at least one security transaction which incorporates at least the pre-established critical security parameter.

In this second systematic embodiment of the invention, the local computer system comprises; a computer processor, a computer memory coupled to the computer processor, a token interface coupled to the computer processor and operative to functionally couple the security token to the computer system, a computer communications interface coupled to the computer processor and operative to facilitate communications with at least a registration authority, and one or more computer applications operatively stored in a portion of the computer memory having instructions executable by the computer processor to at least initiate a digital certification generation process between the security token and the registration authority and exchange communications between the security token and at least a registration authority.

In this second systematic embodiment of the invention the registration authority comprises; an authority processor, a authority memory coupled to the authority processor, a data store coupled to the authority processor where the data store includes at least one critical security parameter associated with the pre-established critical security parameter, an authority communications interface coupled to the authority processor and operative to facilitate communications with at least the computer system and one or more authority applications operatively stored in a portion of the authority memory.

The one or more authority applications having instructions executable by the authority processor to at least; cause the PKI key pair to be stored in the token memory, cause the security token to perform the at least one security transaction, and confirm that the pre-established critical security parameter is operatively stored within the security token, where the at least one security transaction comprises a challenge/response protocol, a keyed hashed message authentication code, a digital signature or a combination thereof.

In a further systematic embodiment of the invention the one or more token applications includes instructions executable by the token processor to send a public key associated with the PKI key pair to at least the registration authority and operatively store a digital certificate which incorporates the public key. In this further systematic embodiment of the invention the one or more authority applications further includes instructions executable by the authority processor to cause the digital certificate to be generated and cause the digital certificate to be operatively stored by the security token.

In both systematic embodiments of the invention, the entity specific digital certificate is generated by either the certificate authority or a unified registration authority and incorporates the generated public key and at least a portion of the entity specific information.

In all embodiments of the invention, the communications connections between the computer system, registration authority and the certificate authority should utilize standard security protocols such as secure socket layer (SSL), transport layer security (TLS), private communications technology (PCT), internet protocol security (IPsec) or another secure messaging arrangement.

In a first computer program product embodiment of the invention, the invention comprises a computer program embodied in a tangible form readable by a first processing system having executable instructions stored thereon for causing said first processing system to perform at least one security transaction with a security token which at least confirms that a pre-established critical security parameter is operatively stored within said security token, cause a PKI key pair to be operatively stored in said security token, and cause said security token to responsively return a public key associated with said PKI key pair from said security token.

In a further embodiment of the first computer program product, the executable instructions for causing the first processing system are broaded to cause an entity specific digital certificate which incorporates said public key to be generated and cause said entity specific digital certificate to be stored in at least said security token.

The computer program product according may be stored in tangible form includes magnetic media, optical media or logical media such as a CD ROM, floppy disk, data tape, DVD, flash RAM or removable hard disk for installation in a code format comprising byte code, compiled, interpreted, compliable or interpretable.

In a second embodiment of the computer program product, the invention is embodied in a tangible form readable by a processor to perform at least the major steps described in the method portion of the invention.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. Optional components are generally shown in dashed lines. It is intended that changes and modifications can be made to the described embodiment without departing from the true scope and spirit of the subject invention as defined in the claims.

FIG. 2B1—is a detailed block diagram of a second embodiment of the invention where a generate commands to the security token encrypted with a proof of token key.

FIG. 2C1—is a detailed block diagram of a security transaction included in the second embodiment of the invention.

DETAILED DESCRIPTION

This present invention provides an arrangement which facilitates the generation of a trustworthy digital certificate using a security token without requiring a security officer intermediary to verify a user or entity. The applications are envisioned to be programmed in a high level language such as Java™, C++, C, C# or Visual Basic™.

Figure 1:
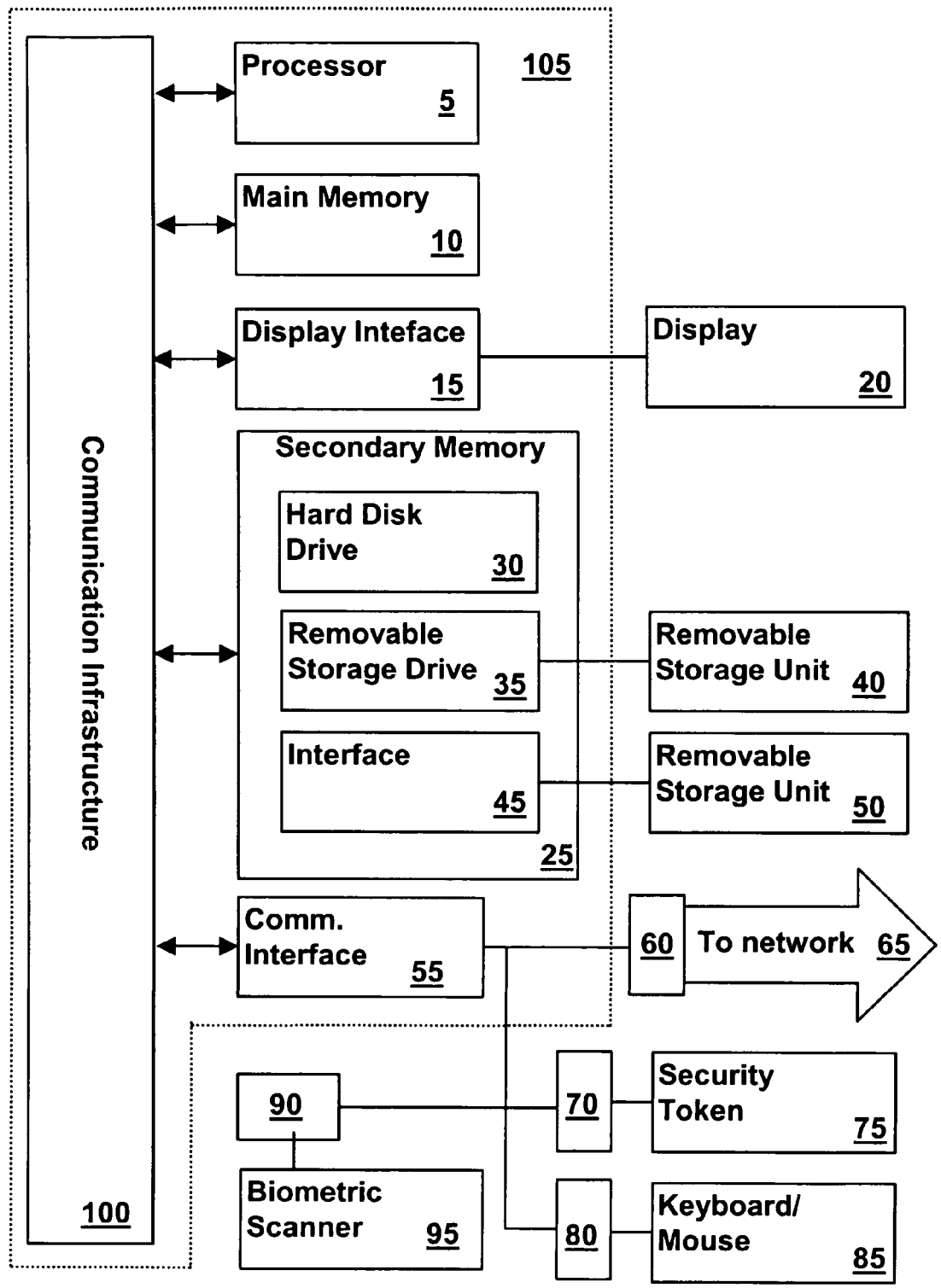
FIG. 1—is a generalized block diagram of a security token enabled computer system and a functionally connected security token.

Referring to FIG. 1, a functional block diagram of the security token enabled computer system is shown which includes a central processor 5, a main memory 10, a display 20 electrically coupled to a display interface 15, a secondary memory subsystem 25 electrically coupled to a hard disk drive 30, a removable storage drive 35 electrically coupled to a removable storage unit 40 and an auxiliary removable storage interface 45 electrically coupled to an auxiliary removable storage unit 50. A communications interface 55 subsystem is coupled to a network 65 via a network interface 60. The network 65 includes standard wired, optical or wireless networks which incorporates a secure communications protocol comprising secure socket layer (SSL), transport layer security (TLS), private communications technology (PCT), internet protocol security (IPsec), or other secure messaging arrangement.

A security token ST 75 is operably coupled to the communications interface 55 via a security token interface 70. The security token 75 includes a unique identifier (not shown) masked into non-volatile memory during the manufacturing process. Entity input devices such as a mouse and a keyboard 85 are operatively coupled to the communications interface 55 via an entity interface 80. Lastly, an optional biometric scanner is operatively coupled to the communications interface 55 via a biometric scanner interface 90.

The central processor 5, main memory 10, display interface 15 secondary memory subsystem 25 and communications interface system 55 are electrically coupled to a communications infrastructure 100. The security token enabled computer system CS 105 includes an operating system having a certificate issuance/renewal application, a security token application programming interface such as PC/SC promulgated by the PC/SC workgroup specifications available from the organization's website www.pcscworkgroup.com, one or more security token aware applications, cryptography software capable of performing symmetric and asymmetric cryptographic functions, secure messaging software and all necessary device interface and driver software.

The security token ST 75 includes an wireless, optical and/or electrical connection means compatible with the security token interface 70, a microprocessor, a cryptography co-processor, volatile and non-volatile memory electrically coupled to the processor and co-processor, a runtime operating environment, cryptography extensions available to the runtime environment and capable of performing symmetric and asymmetric cryptographic functions compatible with the security token enabled computer system's cryptography software, a security executive application, critical security parameter described herein as a proof of token key and one or more critical security parameter (CSP) protected applications.

The proof of token key may be installed by the mechanism described in co-pending U.S. application Ser. No. 09/985,343, entitled, "A System and Method for Generating Symmetric Keys within a Personal Security Device having Minimal Trust Relationships," to a common assignee which is herein incorporated by reference. The proof of token key may be installed inside the security token either pre-issuance or post issuance so long as a verifiable chain of trust has been maintained with the security token ST 75.

Figure 2:
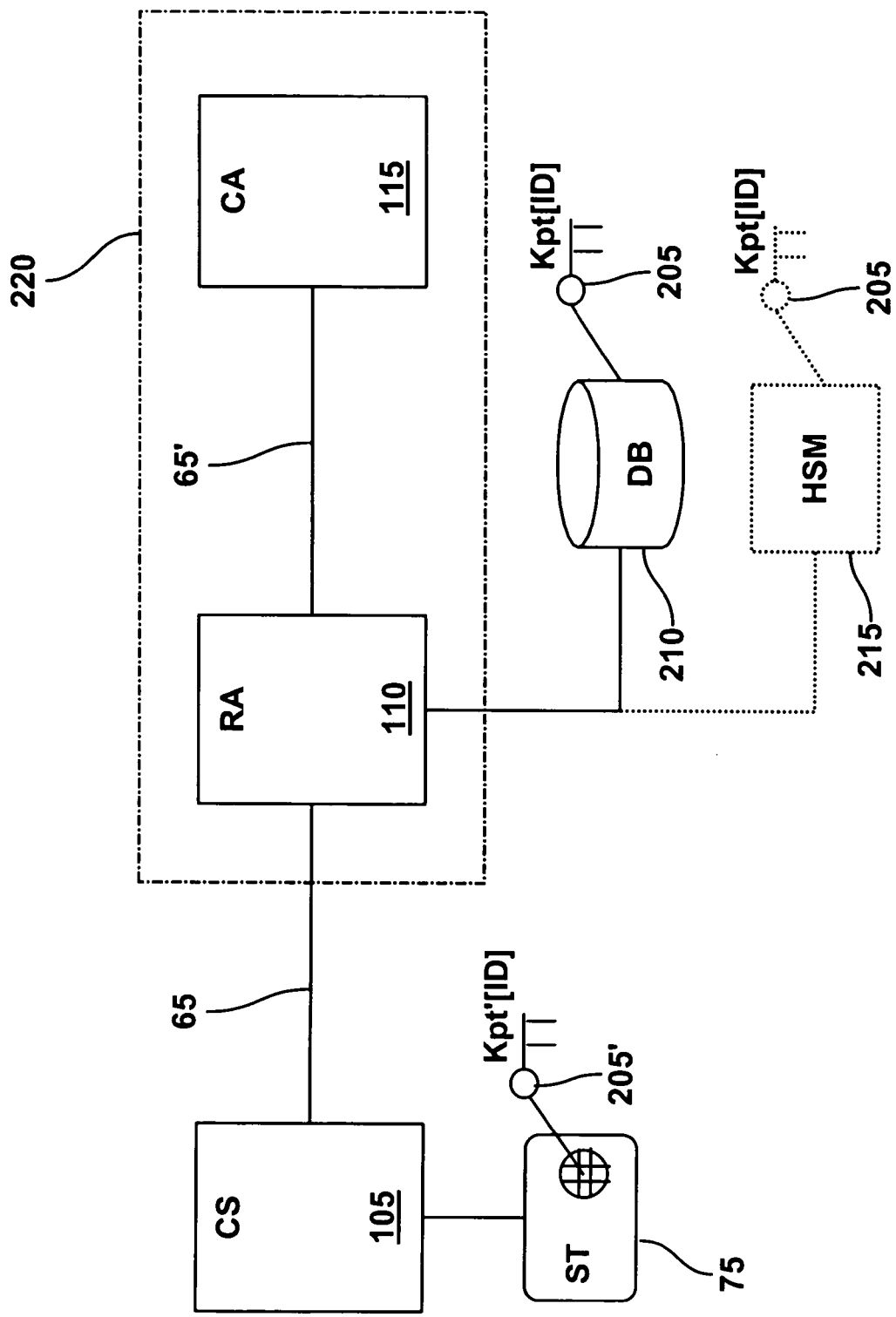
FIG. 2—is a detailed block diagram of the invention and applicable system components.

Referring to FIG. 2, a basic embodiment of the invention is shown where a computer system CS 105 is functionally coupled to a security token ST 75 and in processing communications 65 with a registration authority RA 110. The registration authority RA 110 is in processing communications 65' with a certificate authority CA 115. The certificate authority CA 115 may be a separate third party entity such as Verisign® or an internal entity such as a separate certificate generation server or a server integrated with the registration authority RA 110.

The security token ST 75 includes a pre-established proof of token key set Kpt[ID]205, Kpt'[ID] 205'. One pre-existing proof of token key Kpt'[ID] 205' is injected into the security token ST 75 prior to issuance to the end-entity or user and the counterpart proof of token key Kpt[ID] 205 is saved in a secure database 210 or in a hardware security module 215.

In a one embodiment of invention, the proof of token key set Kpt'[ID] 205', Kpt[ID] 205 symmetric keys having a bit strength of at least 64 bits but preferably 128 bits or greater. The proof of token key Kpt'[ID] 205' is injected into the security token ST 75 with attributes set to non-exportable and may only be accessed by the registration authority or an equivalent administrative entity, typically the token issuer. The registration authority RA 110 includes a database or datastore DB 210 having stored thereon one or more proof of token keys Kpt[ID] 205 retrievable using a unique identifier associated with a particular security token as a cross reference. Alternately, the one or more proof of token keys Kpt[ID] 205 may be retrievably stored inside a hardware security module HSM 215.

Figure 2A:
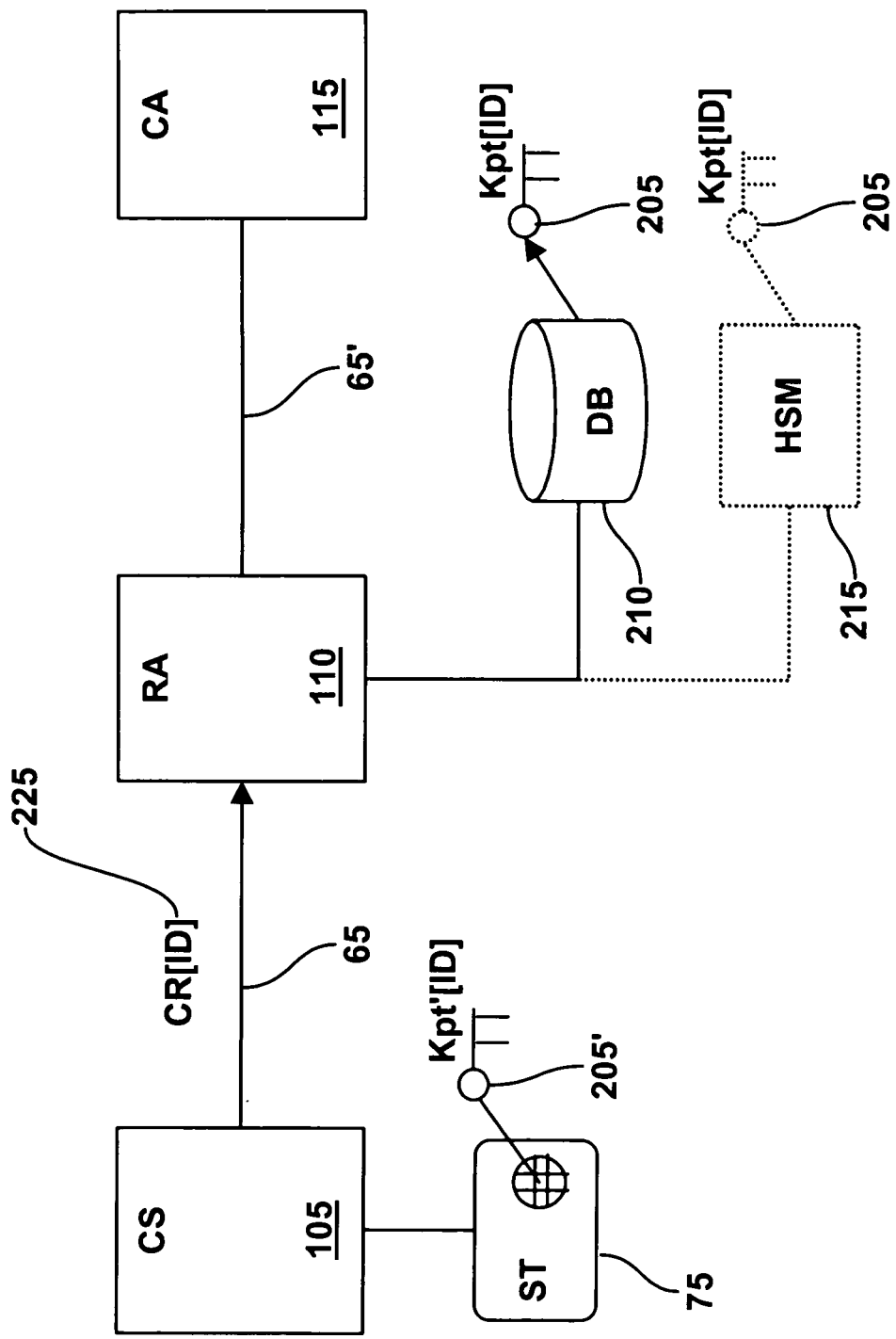
FIG. 2A—is a detailed block diagram of an initiating entity certificate request transmittal.

Referring to FIG. 2A, an initiating process for generating an unsupervised digital certificate is depicted. An entity initiates the process at the computer system CS 105 by invoking a certificate issuance/renewal application associated with the computer system CS 105. The certificate issuance/renewal application receives a unique identifier such as an entity ID and/or security token ID which becomes incorporated into a certificate request CR[ID] 225. The certificate request CR[D] 225 is sent to the registration authority RA 110. The registration authority RA 110 uses the unique identifier to retrieve the proof of token key 205 associated with the unique identifier and security token ST 75. The proof of token key 205 will be used in a security transaction with a security token 75. In an alternate embodiment of the invention, the initiating process is performed automatically by checking an expiration status associated with existing information stored inside the security token ST 75 such as the expiration status of an existing digital certificate.

Figure 2B:
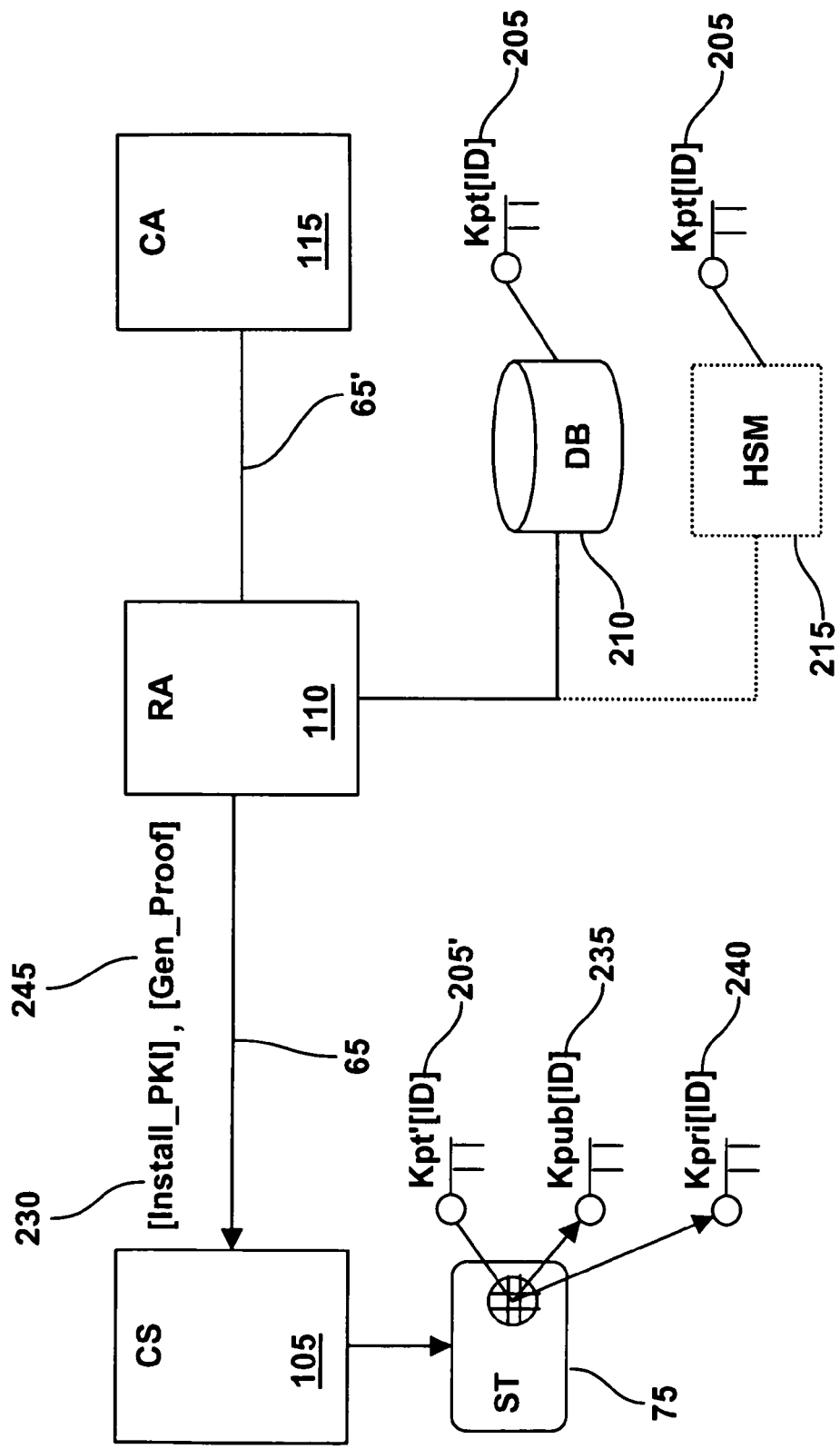
FIG. 2B—is a detailed block diagram of a first embodiment of the invention where commands are sent to a security token unencrypted.

Referring to FIG. 2B, a first embodiment invention is shown where receipt of the certificate request CR[ID] 225 causes the registration authority RA 110 to send an install PKI key pair 230 and generate proof 245 commands to the security token via the computer system 105. The security token ST 75 executes the commands 230, 245 and installs the PKI key pair 235,240. The install PKI key pair command 230 is generalized in this example to include internal generation of the PKI key pair or external generation and injection into a secure domain of the security token ST 75. The PKI key pair 235, 240 includes Diffie-Hellman, Digital Signature (DSA), elliptical curve and RSA asymmetric key pairs. The specific asymmetric algorithm may be customized to suit a particular security and/or performance goal.

For example, Diffie-Hellman key pairs are used for key agreement, DSA key pairs are generally only used for signing, RSA key pairs may be used for both signing and encrypting, and elliptical curve key pairs are used for signing and key agreement. However, algorithms using RSA key pairs take longer to execute than those using Diffie-Hellman which makes optimization desirable for use inside a security token.

In this embodiment of the invention, the communications connection 65 between the computer system CS 105 and the registration authority RA 110 preferably includes a secure communications protocol such as SSL, TLS, IPsec, PCT or other secure messaging arrangement.

The generate proof command 245 is generalized to include standard challenge/response mechanisms which incorporate the proof of token key Kpt'[ID] 205', hashed message authentication codes (HMAC) which incorporate the proof of token key Kpt'[ID] 205' or digital signature which incorporates the generated private key Kpri[ID] 240. However, one skilled in the art will appreciate that combinations of the proof mechanisms may be employed as well.

Referring to FIG. 2B1, an alternate embodiment of the invention is shown where the install PKI key pair 230 and generate proof 245 commands are encrypted with the proof of token key Kpt[ID] 205 retrieved from the datastore 210. In this embodiment of the invention, the incoming commands 230, 245 need to be decrypted using the token's proof of token Kpt'[ID] 205' before any processing is performed by the security token and is particularly suited for use in the digital signature embodiment of the invention described in the discussion provided for FIG. 2C1.

Figure 2C:
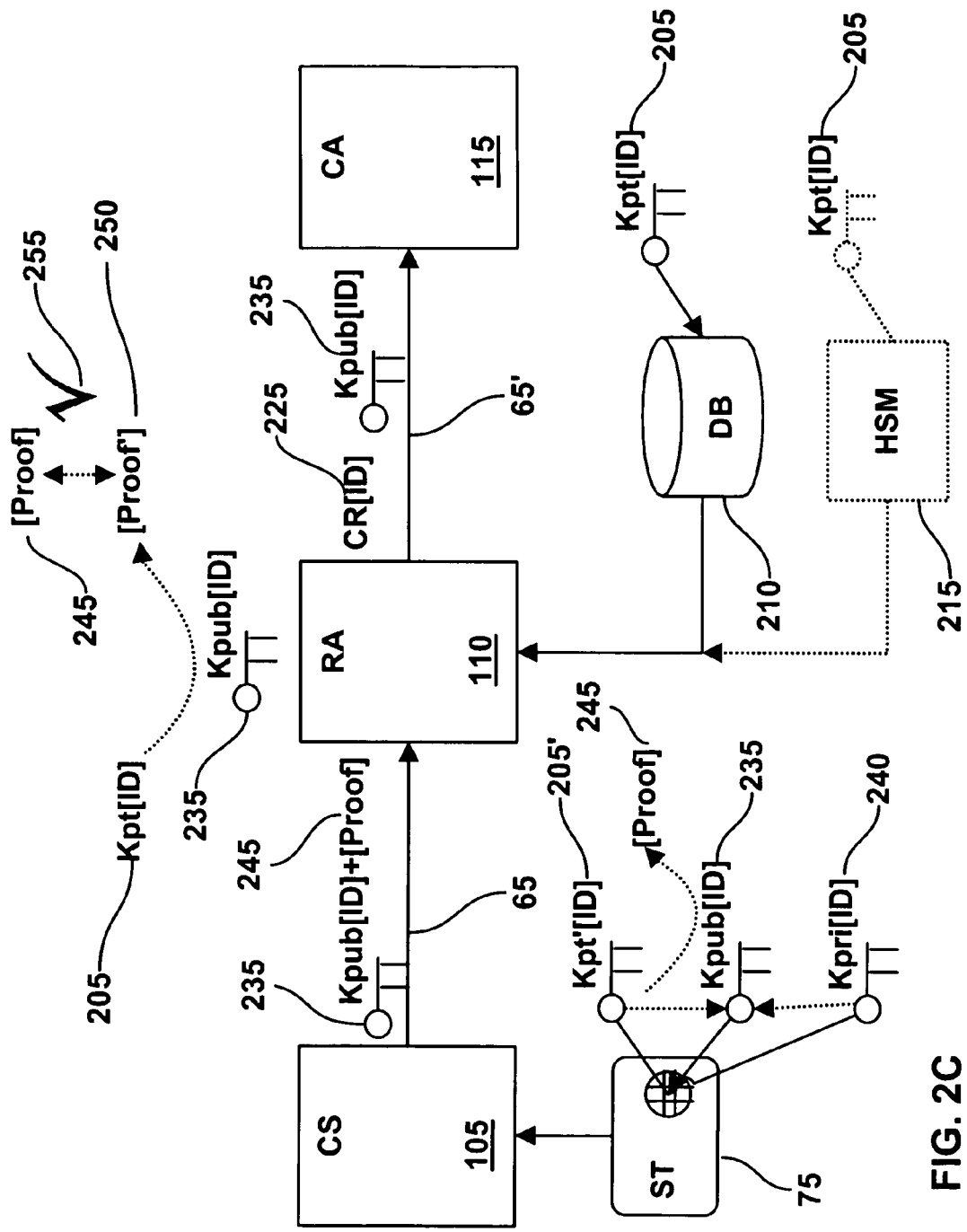
FIG. 2C—is a detailed block diagram of a security transaction included in a first embodiment of the invention.

Referring to FIG. 2C, after executing the commands 230, 245 the security token ST 75 returns the public key 235 portion of the PKI key pair and a proof 245 of the public key to the registration authority RA 110. In this embodiment of the invention, the proof 245 is a keyed message authentication code (HMAC.) The proof of token key 205' or a derivative thereof is used in the generation of the keyed message authentication code HMAC 245. The registration authority RA 110 retrieves the proof of token key Kpt[ID] 205 from the datastore 210 and generates another Proof' 250 using the retrieved proof of token key Kpt[ID] 205 and the same algorithm for comparison 255 with the proof 245 received from the security token ST 75. If the two proofs 245, 250 match 255, the entity specific digital certificate request CR[ID] 225 and the public key 235 are sent to the certificate authority CA 115 for generation of an entity specific digital certificate.

Referring to FIG. 2C1, an another embodiment of the invention is shown where the proof 245 is a digital signature of the public key Kpub[ID] 235 using the counterpart private key Kpri[ID] 240. In this embodiment of the invention, the public key Kpub[ID] 235 and the proof 245 are encrypted with the token's proof of token key Kpt'[ID] 205' and sent to the registration authority for confirmation. The registration authority decrypts the received public key Kpub[ID] 235 and the proof 245 with the proof of token key Kpt[ID] 205 retrieved from the datastore 210 and then verifies the digital signature using the received public key Kpub[ID] 235. If the two proofs 245, 250 match 255, the entity specific digital certificate request CR[ID] 225 and the public key 235 are sent to the certificate authority CA 115 for generation of an entity specific digital certificate as described above.

Figure 2D:
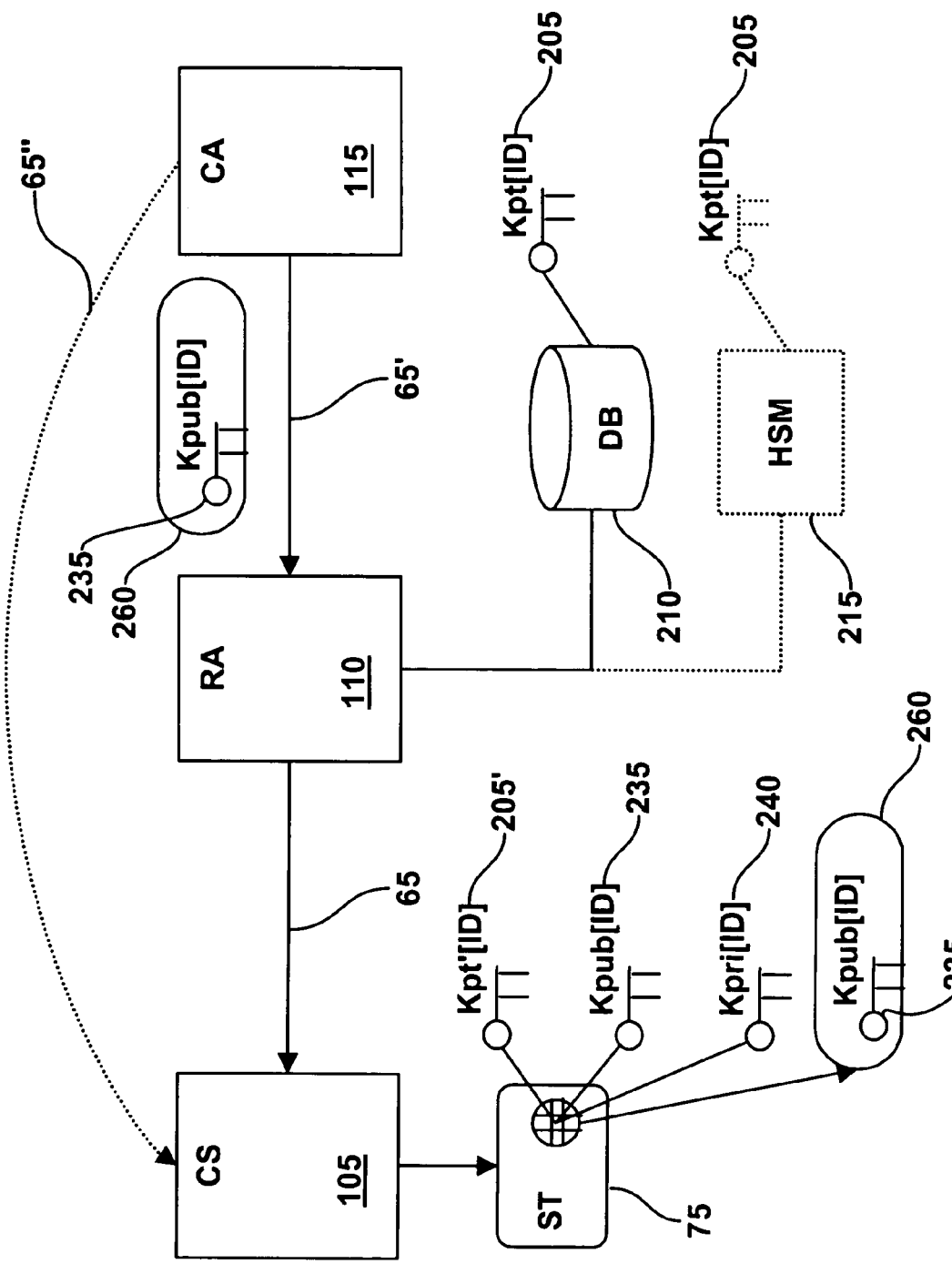
FIG. 2D—is a detailed block diagram of a common inventive embodiment where a generated digital certificate being sent to the security token.

Referring to FIG. 2D, the certificate authority CA 115 receives the entity specific digital certificate request CR[ID] 225 and the public key 235 and generates an entity specific digital certificate 260 which incorporates the public key 235 and at least a portion of entity specific digital certificate request CR[ID] 225. The digital certificate 260 is returned to the registration authority RA 110 where it is subsequently stored inside the security token ST 75. Alternately, the digital certificate 260 may be returned directly to the computer system CS 105 and stored inside the security token 75.

Figure 2E:
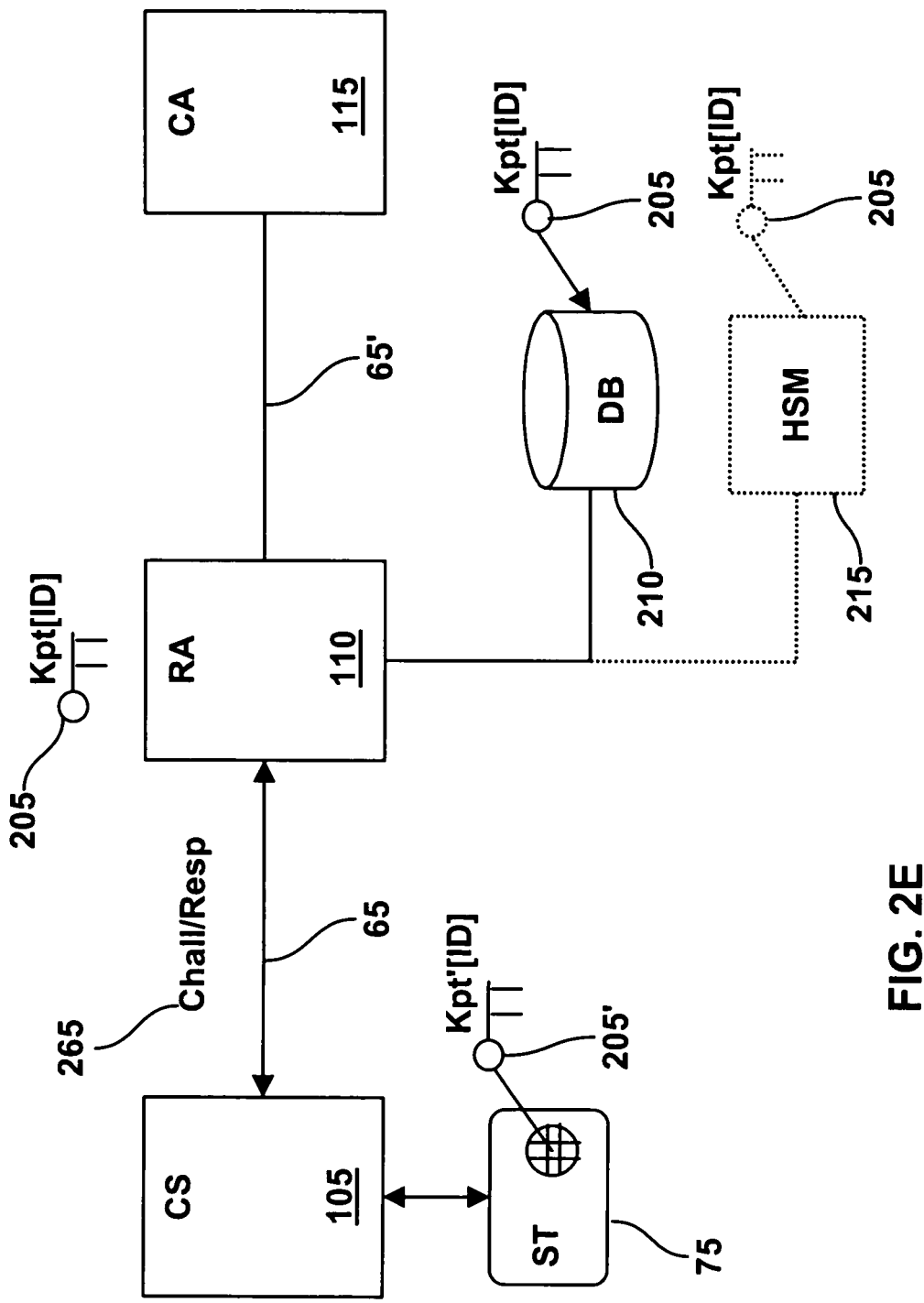
FIG. 2E—is a detailed block diagram of a second embodiment of the invention where a challenge/response security transaction is incorporated.

Referring to FIG. 2E, another alternate authentication embodiment of the invention is shown which continues following receipt of the certificate request CR[ID] 225 shown in FIG. 2A above. The registration authority RA 110 performs a challenge/response security transaction 265 with the security token ST 75 using the retrieved proof of token key Kpt[ID] 205 or a derivative thereof. The proof of token key set Kpt' [ID] 205', Kpt[ID] 205 will be incorporated into a secure messaging session which provides a secure communications channel between the security token ST 75 and the registration authority RA 110.

Figure 2F:
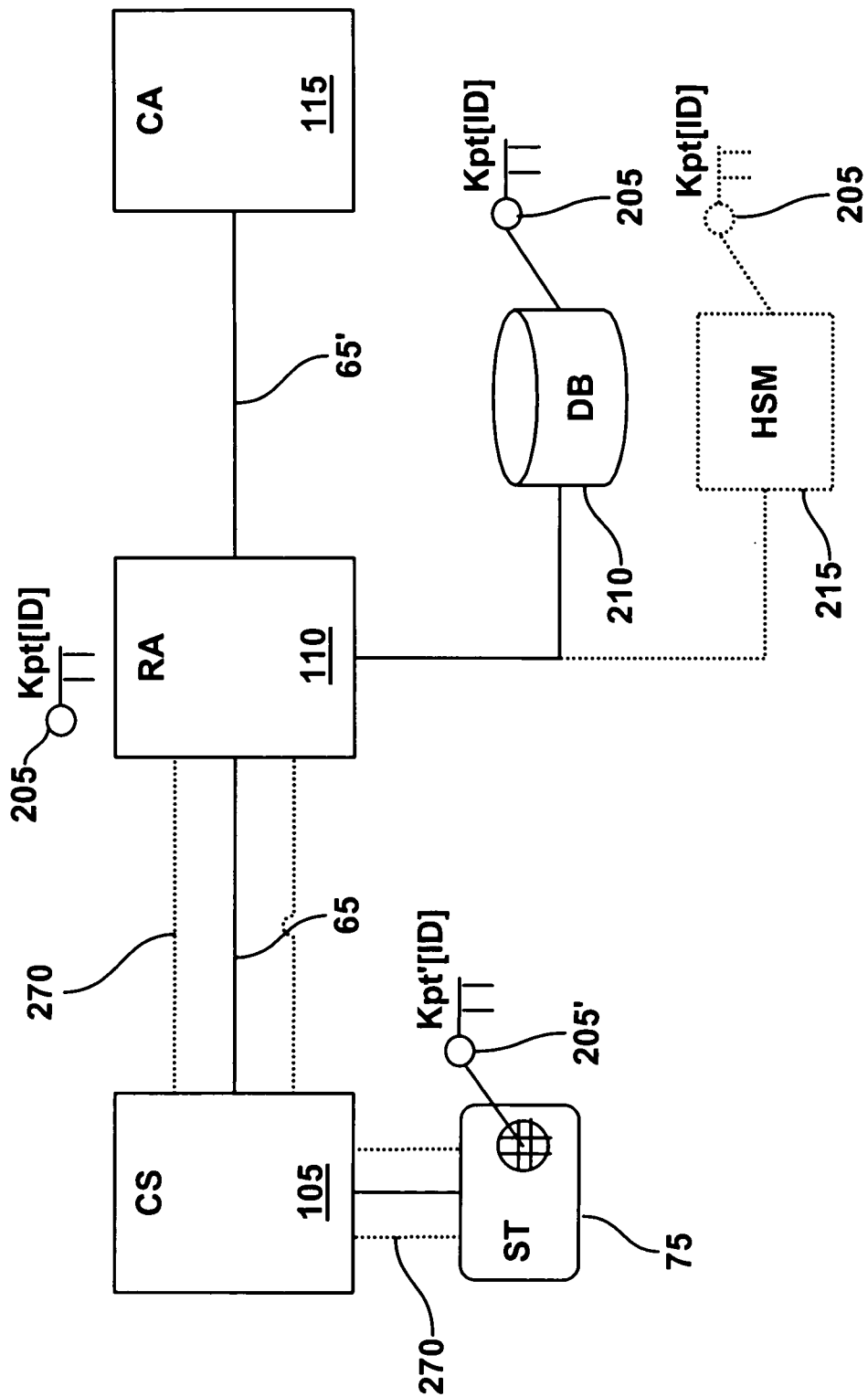
FIG. 2F—is a detailed block diagram of the second embodiment of the invention where a secure communications channel is established using a proof of token key set.

Referring to FIG. 2F, once the security token ST 75 has been successfully authenticated to the registration authority RA 110 a symmetric secure messaging arrangement 270 is established between the security token ST 75 and the registration authority RA 110. This secure messaging arrangement is described in co-pending U.S. patent application Ser. No. 10/424,783, entitled "Universal Secure Messaging For Cryptographic Modules" filed on Apr. 29, 2003 and assigned to a common assignee and is herein incorporated by reference.

Figure 3:
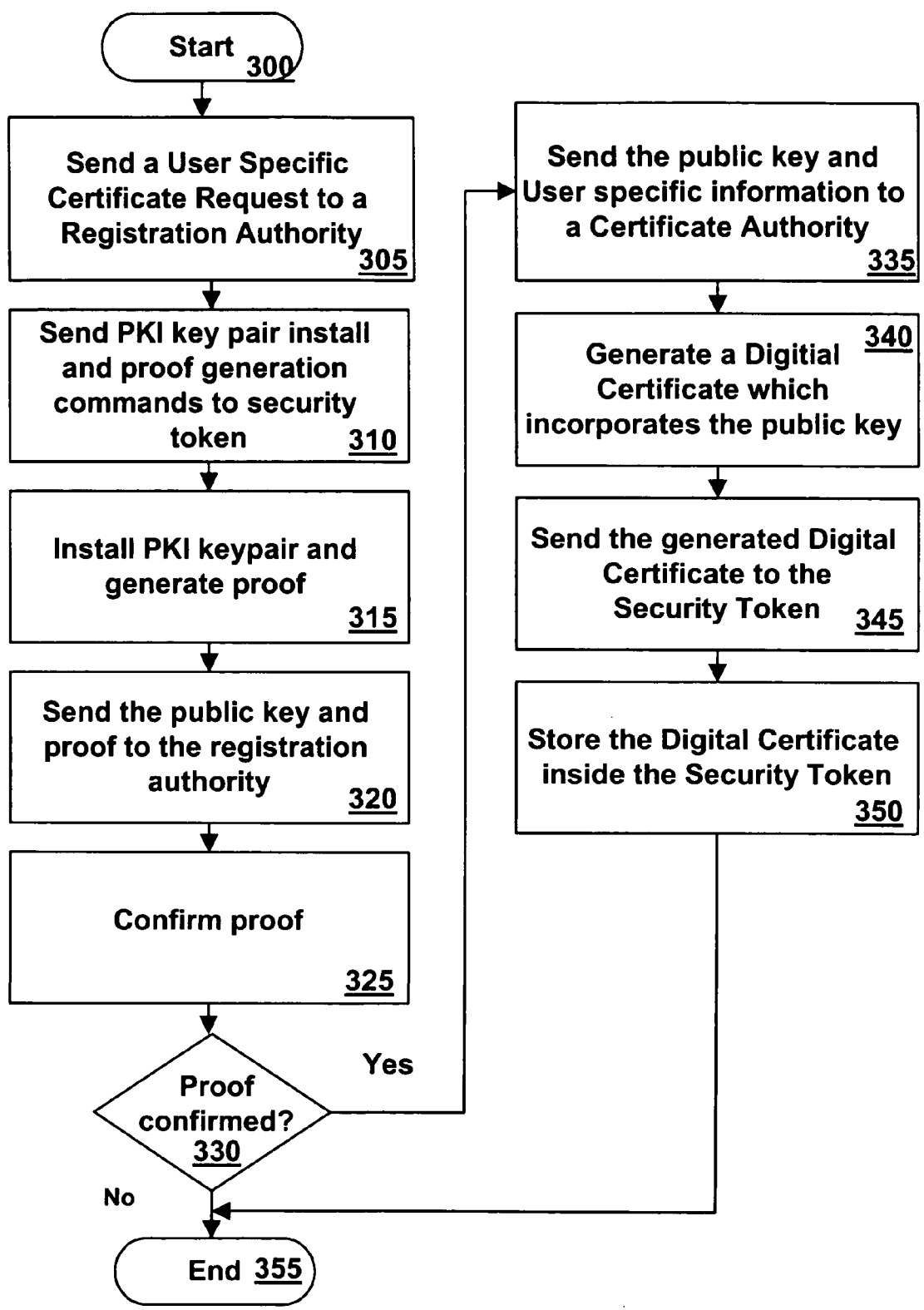
FIG. 3—is a flow diagram illustrating the major steps associated with a first embodiment of the invention.

Referring to FIG. 3, the major steps involved in a first embodiment of the invention for generating an unsupervised digital certificate is shown. The process is initiated 300 by sending an entity specific digital certificate request to a registration authority 305. In this first embodiment invention, the registration authority sends a PKI key pair install command to the security token 310. The install command is generalized to include both internal and external generation of the PKI key pair and a proof command. The security token installs the PKI key pair and a proof which incorporates a proof of token key 315. Depending on the type of proof requested by the proof command, the PKI key pair and a proof commands may be encrypted using the registration authority's proof of token key.

In the encrypted command version of the invention, the incoming commands are decrypted using the token's proof of token key. The type of proof may be a hashed message authentication code generated from the recently installed public key component of the PKI key pair and the proof of token key, or a digital signature of the public key generated by signing the public key with its counterpart private key or an encrypted random number as part of a challenge/response security transaction or other encrypted data confirmable by the registration authority such as the token's unique identifier. In the digital signature embodiment of the invention, the public key and digital signature are encrypted using the proof of token key and sent to the registration authority for confirmation of the proof. In the HMAC embodiment of the invention, the PKI key pair and the proof are returned to the registration authority 320.

The registration authority confirms the proof using a counterpart proof of token key 325 retrieved from a datastore. If the proof is not confirmed 330, processing ends 355 and the entity must restart the process. If the proof is confirmed 330, the registration authority sends the public key and the entity specific digital certificate request to a certificate authority 335. The certificate authority generates an entity specific digital certificate which incorporates the public key and at least a portion of the entity specific digital certificate request 340. The digital certificate is then sent to the security token 345 and stored inside the security token 350. The generated entity specific digital certificate may be sent directly to the computer system hosting the security token or sent via the registration authority. Normal processing terminates following storage of the digital certificate 355.

Figure 3A:
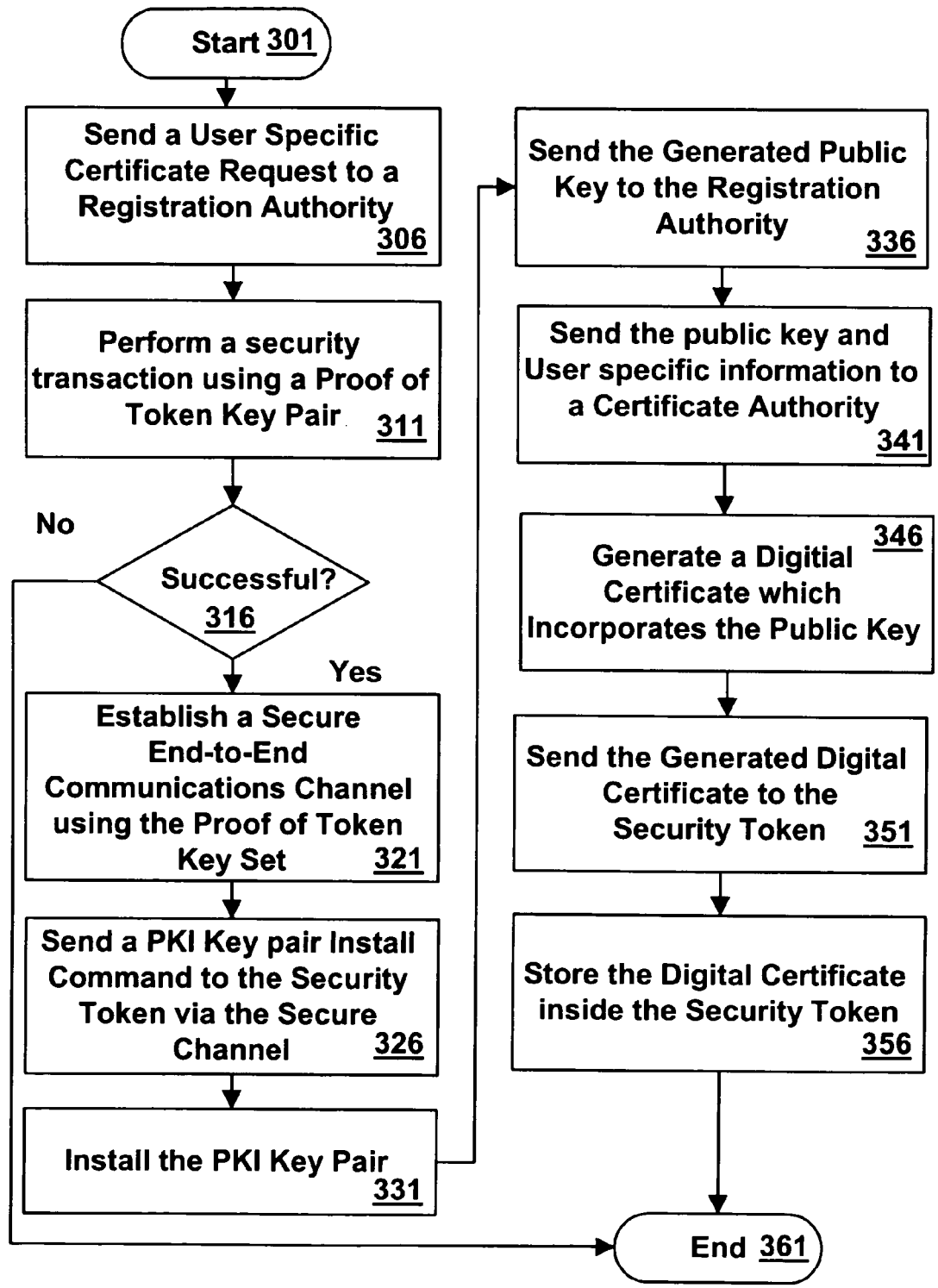
FIG. 3A—is a flow diagram illustrating the major steps associated with a second embodiment of the invention.

Lastly, referring to FIG. 3A, the major steps involved in generating a unsupervised digital certificate using a second embodiment of the invention is shown. In this embodiment of the invention, it is not necessary to send a proof together with the public key as successful establishment of the secure communications arrangement provides an implicit proof to the registration authority. The process is initiated 301 by sending an entity specific digital certificate request to the registration authority as before 306, followed by performing a security transaction in a process which incorporates the proof of token key set 311. If the security transaction is not successful 316, processing ends 361 and the entity must again restart the process.

If the security transaction is successful 316, a secure end-to-end communications channel is established between the security token and registration authority 321. The secure communications channel incorporates the proof of token key set into a symmetric cryptography session.

Once the secure communications channel has been established, the registration authority sends a PKI key pair install command to the security token 326 which causes the security token to generate a PKI key pair 331. The public key component of the PKI key pair is then returned to the registration authority 320. The registration authority then sends the public key and the entity specific digital certificate request to the certificate authority 341 for generation of a digital certificate which incorporates the public key component of the PKI key pair and at least a portion of the entity specific digital certificate request 346. The digital certificate is then sent as before to the security token 351. Normal processing terminates following storage of the digital certificate 361.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular cryptographic module operating environment. Other variations and embodiments are possible in light of above teachings, and it is not intended that this Detailed Description limit the scope of invention, but rather by the claims following herein.

What is claimed:

1. A method for issuing a trustworthy digital certificate comprising:
    functionally coupling a security token to a computer system, the security token being in processing communications with at least a registration authority via the computer system;
    sending from the computer system a digital certificate generation request to the registration authority, wherein the digital certificate generation request includes at least one of: an entity identifier or a security token identifier, and wherein:
        upon reception of the digital certificate generation request, the registration authority both:
        performs a security transaction with the security token using a critical security parameter securely stored in the security token, wherein information included in the digital certificate generation request is used to identify the critical security parameter and wherein the critical security parameter includes at least one of: authentication data, passwords, PINs, secrets, symmetric and private cryptographic keys which are to be entered into or output from a cryptographic module using a secure mechanism, and
        sends a PKI key pair generation command to the security token,
    the security token receives the PKI key pair generation command and generates a PKI key pair that includes a public key;
    after completion of the PKI key pair generation, the PKI key pair is operatively stored in the security token and the public key of the PKI key pair is sent to the registration authority along with a value based on a proof of token key, wherein the value provides assurances to the registration authority that the PKI key pair was generated within a secure domain of the security token;
    establishing a secure end-to-end communications channel between the security token and the registration authority; and
    upon successfulness of the security transaction including confirmation of the value, the registration authority activates the generation of the digital certificate by a certificate authority using the public key, wherein the registration authority sends the PKI key pair generation command to the security token which causes the security token to generate the PKI key pair and return the public key of the PKI key pair to the registration authority after the secure end-to-end communications channel is established.

2. The method according to claim 1, wherein the proof is a keyed hash message authentication code of the public key using the critical security parameter.

3. The method according to claim 1, wherein the proof is a digital signature of the public key using the private key of the PKI key pair, and wherein the public key and the proof are sent to the registration authority in encrypted form using the critical security parameter.

4. The method according to claim 1, further including establishing the secure end-to-end communications channel using the critical security parameter.

5. The method according to claim 1, wherein the digital certificate includes the public key.

6. The method according to claim 1, wherein the digital certificate is stored in the security token.

7. The method according to claim 1, wherein the PKI key pair is generated internally by the security token.

8. The method according to claim 1, wherein the security transaction comprises a challenge/response protocol, a keyed hashed message authentication code, a digital signature or a combination thereof.

9. The method according to claim 1, wherein the certificate authority and the registration authority are separate entities.

10. The method according to claim 1, wherein the certificate authority and the registration authority is a unified entity.

11. The method according to claim 1, wherein, upon reception of the digital certificate generation request:
    the registration authority sends a first command to the security token which causes the PKI key pair to be operatively installed inside the security token;
    the registration authority sends a second command using a critical security parameter associated with the security token to form a cryptogram, and sends the cryptogram to the security token;
    the security token deciphers the cryptogram using a pre-established critical security parameter operatively stored inside the security token, and returns to at least the registration authority at least one datagram derived from the cryptogram.

12. The method according to claim 11, wherein the second command includes a digital signature of the public key of the PKI key pair.

13. The method according to claim 11, wherein the at least one datagram includes a public key associated with the PKI key pair and a digital signature of the public key.

14. The method according to claim 13, further including verifying the digital signature by at least the registration authority.

15. The method according to claim 11, wherein the second command includes a retrieve public key command.

16. The method according to claim 11, further comprising:
    enciphering the at least one datagram using the pre-established critical security parameter by the security token;
    deciphering the at least one datagram using the critical security parameter by at least the registration authority.

17. The method according to claim 1, wherein the value is provided by hashing the proof of token key with the public key.

18. A system for issuing a trustworthy digital certificate, comprising:
    a security token;
    a computer system; and
    a registration authority, wherein:
    the security token is functionally coupled to the computer system and in processing communications with at least the registration authority via the computer system, and
    the computer system is adapted to at least receive input from an entity and initiate a digital certification generation process between the security token and the registration authority by sending a digital certificate generation request to the registration authority, wherein the digital certificate generation request includes at least one of: an entity identifier or a security token identifier, and characterized in that:

the registration authority, upon reception of the digital certificate generation request, both:

performs a security transaction with the security token using a critical security parameter securely stored in the security token, wherein information included in the digital certificate generation request is used to identify the critical security parameter and wherein the critical security parameter includes at least one of: authentication data, passwords, PINs, secrets, symmetric and private cryptographic keys which are to be entered into or output from a cryptographic module using a secure mechanism, and sends a PKI key pair generation command to the security token, the security token receives the PKI key pair generation command and generates a PKI key pair that includes a public key;

the security token, after completion of the PKI key pair generation, stores the PKI key pair and sends the public key of the PKI key pair to the registration authority along with a value based on a proof of token key, wherein the value provides assurances to the registration authority that the PKI key pair was generated within a secure domain of the security token;

establishing a secure end-to-end communications channel between the security token and the registration authority; and the registration authority, upon successfulness of the security transaction including confirmation of the value, activates the generation of the digital certificate by a certification authority using the public key, wherein the registration authority sends the PKI key pair generation command to the security token which causes the security token to generate the PKI key pair and return the public key of the PKI key pair to the registration authority after the secure end-to-end communications channel is established.

19. The system according to claim 18, wherein the security token is further adapted to operatively store the digital certificate which incorporates the public key.

20. The system according to claim 18, wherein the value is provided by hashing the proof of token key with the public key.

21. The system according to claim 18, wherein:

the security token includes:
　a token processor;
　a token memory coupled to the token processor;
　a pre-established critical security parameter operatively stored in at least a portion of the token memory; and
　one or more token applications operatively stored in a second portion of the token memory having instructions executable by the token processor to at least store the PKI key pair in a third portion of the token memory and perform the security trans action;

the computer system includes:
　a computer processor;
　a computer memory coupled to the computer processor;
　a token interface coupled to the computer processor and operative to functionally couple the security token to the computer system;
　a computer communications interface coupled to the computer processor and operative to facilitate communications with at least the registration authority; and
　one or more computer applications operatively stored in a portion of the computer memory having instructions executable by the computer processor to at least initiate a digital certification generation process between the security token and the registration authority and exchange communications between the security token and at least the registration authority;

the registration authority includes:
　an authority processor;
　an authority memory coupled to the authority processor;
　a data store coupled to the authority processor, the data store including at least one critical security parameter associated with the pre-established critical security parameter;
　an authority communications interface coupled to the authority processor and operative to facilitate communications with at least the computer system; and
　one or more authority applications operatively stored in a portion of the authority memory having instructions executable by the authority processor to at least cause the PKI key pair to be stored in the token memory, cause the security token to perform the at least one security transaction, and confirm that the pre-established critical security parameter is operatively stored within the security token.

22. The system according to claim 21, wherein the one or more token applications includes instructions executable by the token processor to send the public key associated with the PKI key pair to at least the registration authority and operatively store a digital certificate which incorporates the public key.

23. The system according to claim 21, wherein the one or more authority applications includes instructions executable by the authority processor to cause the digital certificate to be generated and cause the digital certificate to be operatively stored by the security token.

24. A computer program stored on a non-transitory computer-readable medium containing instructions which:

upon execution, carry out an operation, while a security token is functionally coupled to a computer system, the security token being in processing communications with at least a registration authority via the computer system, wherein the computer system sends a digital certificate generation request to the registration authority, wherein the digital certificate generation request includes at least one of: an entity identifier or a security token identifier, and upon execution, carry out further operations comprising:

upon reception of the digital certificate generation request, the registration authority both:

performs a security transaction with the security token using a critical security parameter securely stored in the security token, wherein information included in the digital certificate generation request is used to identify the critical security parameter and wherein the critical security parameter includes at least one of: authentication data, passwords, PINs, secrets, symmetric and private cryptographic keys which are to be entered into or output from a cryptographic module using a secure mechanism, and sends a PKI key pair generation command to the security token, the security token receives the PKI key pair generation command and generates a PKI key pair that includes a public key;

after completion of the PKI key pair generation, the PKI key pair is securely stored in the security token and the public key of the PKI key pair is sent to the registration authority along with a value based on a proof of token key, wherein the value provides assurances to the registration authority that the PKI key pair was generated within a secure domain of the security token; and establishing a secure end-to-end communications channel between the security token and the registration authority; and upon successfulness of the security transaction including confirmation of the value, the registration authority activates the generation of the digital certificate by a certificate authority using the public key, wherein the registration authority sends the PKI key pair generation command to the security token which causes the security token to generate the PKI key pair and return the public key of the PKI key pair to the registration authority after the secure end-to-end communications channel is established.

25. The computer program according to claim 24, wherein the public key of the PKI key pair is sent to the registration authority with a proof of possession by the security token of the public key.

26. The computer program according to claim 25, wherein the proof of possession is a keyed hash message authentication code of the public key using the critical security parameter.

27. The computer program according to claim 25, wherein the proof of possession is a digital signature of the public key using the private key of the PKI key pair, and wherein the public key and the proof of possession are sent to the registration authority in encrypted form using the critical security parameter.

28. The computer program according to claim 24, wherein the security transaction is used to establish the secure end-to-end communication channel using the critical security parameter between the security token and the registration authority, before sending the public key to the registration authority.

29. The computer program according to claim 28, wherein the secure end-to-end communication channel is established, upon successfulness of the performed security transaction, and wherein once the secure communications channel has been established, the registration authority sends the PKI key pair generation command to the security token which causes the security token to generate the PKI key pair and return the public key of the PKI key pair to the registration authority.

30. The computer program according to claim 24, wherein the digital certificate includes the public key.

31. The computer program according to claim 24, wherein the digital certificate is stored in the security token.

32. The computer program according to claim 24, wherein the PKI key pair is generated internally by the security token.

33. The computer program according to claim 24, wherein the security transaction comprises a challenge/response protocol, a keyed hashed message authentication code, a digital signature or a combination thereof.

34. The computer program according to claim 24, wherein the certificate authority and the registration authority are separate entities.

35. The computer program according to claim 24, wherein the certificate authority and the registration authority is a unified entity.

36. The computer program according to claim 24, wherein, upon reception of the digital certificate generation request:
the registration authority sends a first command to the security token which causes the PKI key pair to be operatively installed inside the security token;
the registration authority sends a second command using a critical security parameter associated with the security token to form a cryptogram, and sends the cryptogram to the security token;
the security token deciphers the cryptogram using a pre-established critical security parameter operatively stored inside the security token, and returns to at least the registration authority at least one datagram derived from the cryptogram.

37. The computer program according to claim 36, wherein the second command includes a digital signature of the public key of the PKI key pair.

38. The computer program according to claim 36, wherein the at least one datagram includes a public key associated with the PKI key pair and a digital signature of the public key.

39. The computer program according to anyone of claims 24-38, wherein the computer-readable medium includes magnetic media, optical media or logical media.

40. The computer program according to anyone of claims 24-38, wherein the instructions are stored in a code format including byte code, compiled, interpreted, compilable or interpretable.

41. The system according to claim 18, wherein:
the secure end-to-end communications channel is established using the critical security parameter between the security token and the registration authority, before sending the public key to the registration authority;
the secure end-to-end communication channel is established upon successfulness of the performed security transaction; and
once the secure communications channel has been established, the registration authority sends the PKI key pair generation command to the security token which causes the security token to generate the PKI key pair and return the public key of the PKI key pair to the registration authority.

42. The computer program according to claim 24, wherein the value is provided by hashing the proof of token key with the public key.

* * * * *